United States Patent
Ji et al.

(10) Patent No.: US 11,943,113 B2
(45) Date of Patent: Mar. 26, 2024

(54) METHOD FOR CONSTRUCTING SYNCHRONOUS NETWORK, SHELF LABEL SYSTEM, AND COMPUTER DEVICE

(71) Applicant: HANSHOW TECHNOLOGY CO., LTD., Jiaxing (CN)

(72) Inventors: Yaping Ji, Jiaxing (CN); Qi Jiang, Jiaxing (CN); Min Liang, Jiaxing (CN)

(73) Assignee: HANSHOW TECHNOLOGY CO. LTD., Jiaxing (CN)

( * ) Notice: Subject to any disclaimer, the term of this patent is extended or adjusted under 35 U.S.C. 154(b) by 0 days.

(21) Appl. No.: 18/213,802

(22) Filed: Jun. 23, 2023

(65) Prior Publication Data

US 2023/0388192 A1 Nov. 30, 2023

Related U.S. Application Data (63) Continuation of application No. 18/138,024, filed on Apr. 21, 2023.

(30) Foreign Application Priority Data

Apr. 25, 2022 (CN) .......................... 202210436190.6

(51) Int. Cl.
*H04L 41/12* (2022.01)
*H04W 56/00* (2009.01)

(52) U.S. Cl.
CPC ........... *H04L 41/12* (2013.01); *H04W 56/001* (2013.01)

(58) Field of Classification Search
CPC .............................. H04L 41/12; H04W 56/001
See application file for complete search history.

(56) References Cited

U.S. PATENT DOCUMENTS

| | | | |
|---|---|---|---|
| 2007/0036089 A1* | 2/2007 | Metke | ................ H04W 72/541 |
| | | | 370/254 |
| 2015/0034719 A1 | 2/2015 | Wei et al. | |

(Continued)

FOREIGN PATENT DOCUMENTS

| | | |
|---|---|---|
| CN | 102752844 A | 10/2012 |
| CN | 106507479 A | 3/2017 |

(Continued)

OTHER PUBLICATIONS

The First CNOA issued in Application No. 202210436190.6 dated Jun. 8, 2022 with English translation and its first search report dated May 31, 2022, (15p).

(Continued)

*Primary Examiner* — Kyaw Z Soe
(74) *Attorney, Agent, or Firm* — Arch & Lake LLP (57) ABSTRACT

A shelf label system and a method thereof are provided. The shelf label system includes base stations and at least one server. The at least one server may be configured to: obtain a target network topological structure according to a master base station having a shallowest topological depth and a ranging result between a base station and a superior base station of the base station, where each base station has a single superior base station; generate a transceiving time slot periodic table by allocating a transceiving time slot to each base station according to the target network topological structure; and obtain a synchronous network of the shelf label system by instructing the base stations to transmit and receive synchronous signals according to the transceiving time slot periodic table. The shelf label system further includes electronic shelf labels that receive the synchronous signals from the base stations.

20 Claims, 4 Drawing Sheets

(56) References Cited

U.S. PATENT DOCUMENTS

2019/0335479 A1* 10/2019 Thubert ................ H04B 1/713
2021/0367849 A1   11/2021 Kandaswamy et al.

FOREIGN PATENT DOCUMENTS

| CN | 108092732  | A  | 5/2018  |
|----|------------|----|---------|
| CN | 110248416  | A  | 9/2019  |
| CN | 110793527  | A  | 2/2020  |
| CN | 111695223  | A  | 9/2020  |
| CN | 111954296  | A  | 11/2020 |
| WO | 2022057456 | A1 | 3/2022  |
| WO | 2022057472 | A1 | 3/2022  |

OTHER PUBLICATIONS

International Search Report, Written Opinion of the International Search Authority, Notification of Transmittal of International Search Report and Written Opinion issued in Application No. PCT/CN2023/090494 dated Jul. 13, 2023, (8p).

* cited by examiner

METHOD FOR CONSTRUCTING SYNCHRONOUS NETWORK, SHELF LABEL SYSTEM, AND COMPUTER DEVICE

CROSS-REFERENCE TO RELATED APPLICATIONS

This application is a continuation of U.S. application Ser. No. 18/138,024 filed on Apr. 21, 2023, which is based upon and claims priority to Chinese Patent Application No. 202210436190.6, filed on Apr. 25, 2022, which is hereby incorporated by reference in its entirety for all purposes.

TECHNICAL FIELD

The present disclosure relates to a field of communication technologies, and in particular, to a method for constructing a synchronous network, a shelf label system, and a computer device.

BACKGROUND

With the increasing application of the electronic shelf label system in various retail fields and the increasing scale of stores, a plurality of base stations need to be deployed in the stores. The plurality of base stations are communicated through an asynchronous cellular network. However, in the existing asynchronous cellular network, the plurality of base stations in the store perform signal transmission and reception asynchronously, and time slots used are prone to conflict, which may cause interferences between signal transmission and reception of the plurality of base stations, and lead to communication failure between the base stations and the shelf label.

It can be seen that in the prior art, the plurality of base stations in the electronic shelf label system will interfere with each other during signal transmission and reception, which reduces the accuracy and stability of the electronic shelf label system and cannot meet the actual needs of the store deployed with the plurality of base stations.

SUMMARY

Aiming at the defects in the prior art, the present disclosure provides a method for constructing a synchronous network, a shelf label system, and a computer device, which solve the problem in the prior art that a plurality of base stations in an electronic shelf label system interfere with each other during signal transmission and reception. The present disclosure keeps time synchronization between a plurality of base stations by establishing a synchronous network, and prevents a signal interference by a time-slotted data transmission and reception based on the synchronous network, thereby improving the stability and the data throughput of the electronic shelf label system.

According to a first aspect, the present disclosure provides a shelf label system. The shelf label system includes one or more base stations and a server that communicates with the one or more base station. Furthermore, the server is configured to: obtain a target network topological structure according to a master base station having a shallowest topological depth and a ranging result between a base station and a superior base station of the base station, where each base station in the target network topological structure has a single superior base station; generate a transceiving time slot periodic table by allocating a transceiving time slot to each base station according to the target network topological structure; and obtain a synchronous network of the shelf label system by instructing the one or more base stations to transmit and receive synchronous signals according to the transceiving time slot periodic table.

According to a second aspect, the present disclosure provides a method for constructing a synchronous network. In the method, a server in a shelf label system obtains a target network topological structure according to a master base station having a shallowest topological depth and a ranging result between a base station and a superior base station of the base station, where each base station in the target network topological structure has a single superior base station. Additionally, the server may generate a transceiving time slot periodic table by allocating a transceiving time slot to each base station according to the target network topological structure and obtain a synchronous network of the shelf label system by instructing one or more base stations in the shelf label system to transmit and receive synchronous signals according to the transceiving time slot periodic table, where one or more electronic shelf labels in the shelf label system receive the synchronous signals from the one or more base stations.

According to a second aspect, the present disclosure provides a non-transitory computer readable storage medium which stores a plurality of programs for execution by a server in a shelf label system. Furthermore, the server has one or more processors, and the plurality of programs, when executed by the one or more processors, cause the server to perform acts including: obtaining a target network topological structure according to a master base station having a shallowest topological depth and a ranging result between a base station and a superior base station of the base station, where each base station in the target network topological structure has a single superior base station; generating a transceiving time slot periodic table by allocating a transceiving time slot to each base station according to the target network topological structure; and obtaining a synchronous network of the shelf label system by instructing one or more base stations in the shelf label system to transmit and receive synchronous signals according to the transceiving time slot periodic table, where one or more electronic shelf labels in the shelf label system receive the synchronous signals from the one or more base stations.

DETAILED DESCRIPTION OF THE PREFERRED EMBODIMENTS

For a clearer illustration of the objectives, technical features and effects of the present disclosure, a clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In one aspect, the present disclosure provides a method for constructing a synchronous network, which specifically includes the following embodiments.

Figure 1:
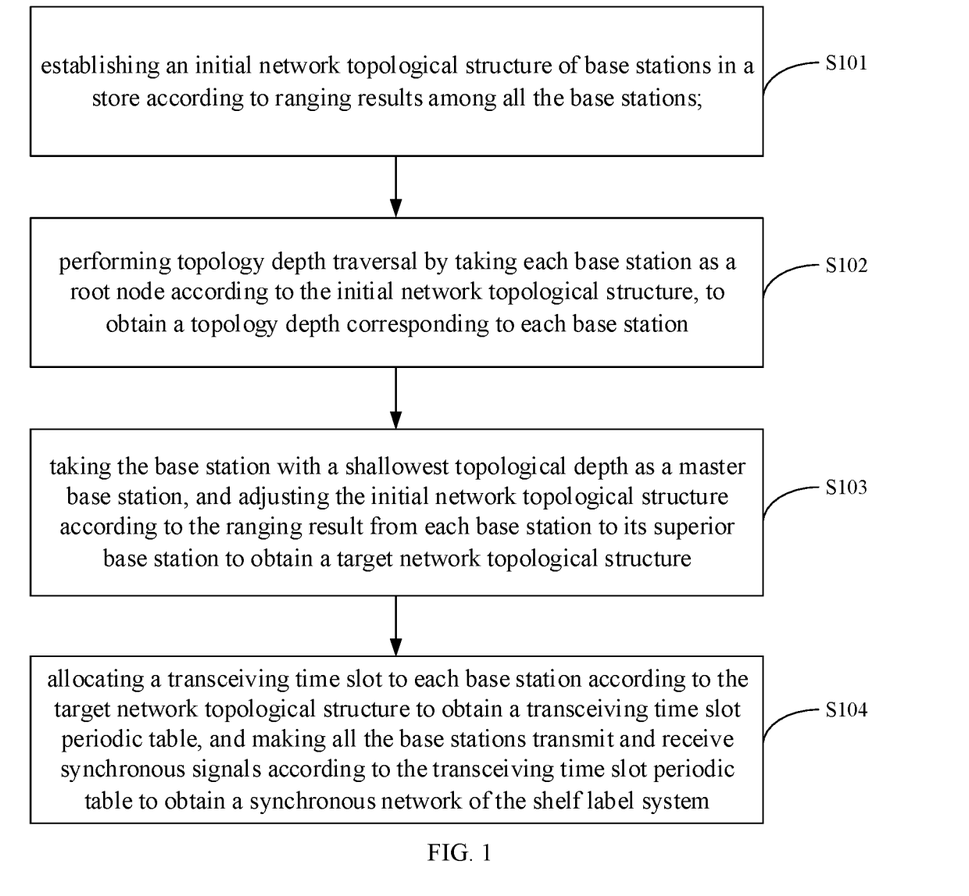
FIG. 1 illustrates a flow diagram of a method for constructing a synchronous network according to an embodiment of the present disclosure.

FIG. 1 illustrates a flow diagram of a method for constructing a synchronous network according to an embodiment of the present disclosure. As illustrated in FIG. 1, when being applied to a shelf label system that includes a server, base stations and an electronic shelf label, the method specifically includes:

step S101: establishing an initial network topological structure of base stations in a store according to ranging results among all the base stations.

Figure 2:
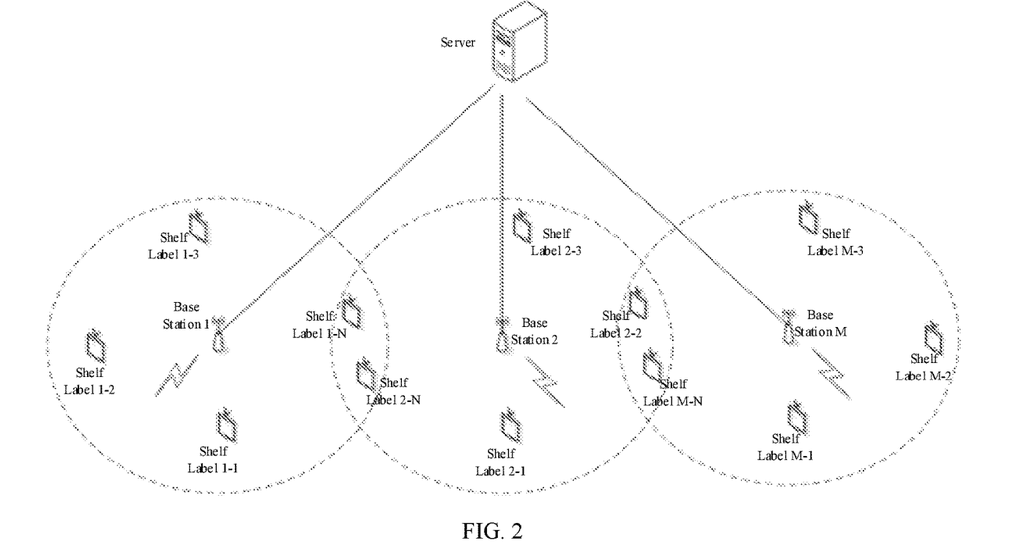
FIG. 2 illustrates a structural diagram of a shelf label system according to an embodiment of the present disclosure.

It should be noted that, as illustrated in FIG. 2, in this embodiment, the shelf label system in each store includes a server, a plurality of base stations and a plurality of electronic shelf labels. The server transmits trigger information or a control instruction to the electronic shelf labels through the base stations, and each base station transmits a synchronization signal and a data signal that includes the trigger information or the control instruction periodically.

Figure 3:
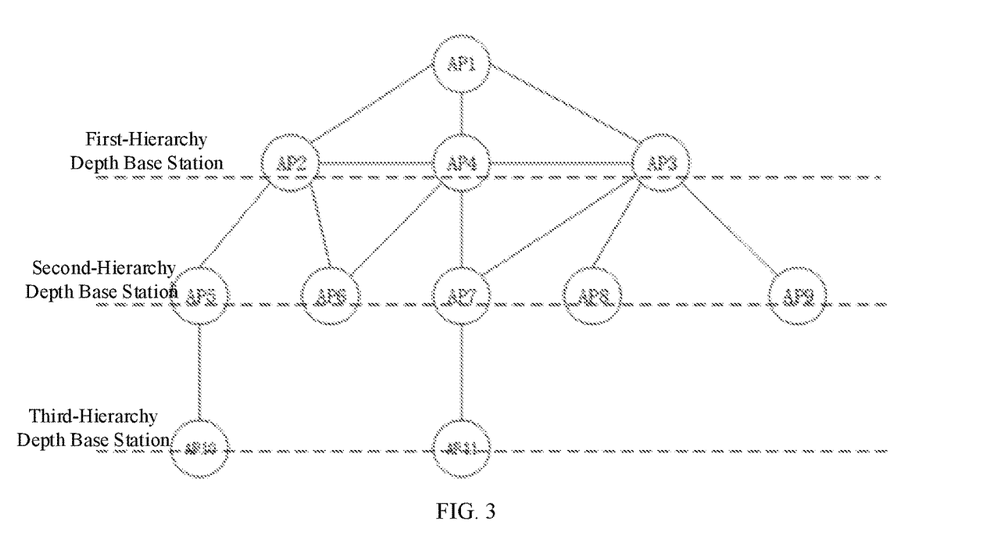
FIG. 3 illustrates a schematic diagram of an initial network topological structure according to an embodiment of the present disclosure.

In this embodiment, the server controls all the base stations in the store to transmit ranging signals in turn, and obtains a ranging result from each base station to the other base stations according to a strength of a feedback signal transmitted by the other base stations and received by the base station; the server then establishes an initial network topological structure of the base stations according to the ranging results among all the base stations, as illustrated in FIG. 3. The ranging result includes, but is not limited to, no communication, a long distance and a short distance. In the initial network topological structure, a length of a line segment between the base stations may be expressed as the long distance or the short distance. In FIG. 3, AP1 represents base station 1, AP2 represents base station 2, ..., and AP11 represents base station 11.

step S102: performing topology depth traversal by taking each base station as a root node according to the initial network topological structure, to obtain a topology depth corresponding to each base station.

In this embodiment, performing topology depth traversal by taking each base station as the root node according to the initial network topological structure to obtain the topology depth corresponding to each base station specifically includes: taking a current base station as a root node, and taking the base station directly connected to the current base station as a first-hierarchy depth base station; taking, when there is a lower-hierarchy base station connected to the first-hierarchy depth base station, the lower-hierarchy base station as a second-hierarchy depth base station, and so on, until an $M^{th}$-hierarchy depth base station is traversed; and setting, when there is no base station connected to the $M^{th}$ hierarchy depth base station, a topological depth of the current base station as M, where M may be a positive integer greater than 1.

For example, as illustrated in FIG. 3, when AP1 is the root node, AP2, AP3 and AP4 are the first-hierarchy depth base stations, AP5, AP6, AP7, AP8 and AP9 are the second-hierarchy depth base stations, and AP10 and AP11 are the third-hierarchy depth base stations, the topological depth of AP1 is 3. When AP2 is the root node, AP5, AP6, AP4 and AP1 are the first-hierarchy depth base stations, AP10, AP7 and AP3 are the second-hierarchy depth base stations, and AP11, AP8 and AP9 are the third-hierarchy depth base stations, the topological depth of AP2 is 3. By analogy, when AP11 is the root node, AP7 is the first-hierarchy depth base station, AP4 and AP3 are the second-hierarchy depth base stations, AP6, AP1, AP8 and AP9 are the third-hierarchy depth base stations, AP2 is the fourth-hierarchy depth base station, AP5 is the fifth-hierarchy depth base station, and AP10 is the sixth-hierarchy depth base station, the topological depth of AP11 is 6.

It should be noted that when there is a target depth base station belonging to an $X^{th}$-hierarchy depth base station or an $(X-1)^{th}$-hierarchy depth base station among the lower-hierarchy base stations connected to the $X^{th}$-hierarchy depth base station, the target depth base station is not counted in an $(X+1)^{th}$-hierarchy depth base station, where X may be a positive integer greater than 1. For example, when AP1 is the root node, AP2, AP3 and AP4 are the first-hierarchy depth base stations, and there is AP4 among the lower-hierarchy base stations connected to AP2, then AP4 should, in principle, belong to the second-hierarchy depth base station together with AP5 and AP6. However, AP4 already belongs to the first-hierarchy depth base station, so AP4 is not included in the second-hierarchy depth base station. In this embodiment, AP4 is the target depth base station mentioned above.

step S103: taking the base station with a shallowest topological depth as a master base station, and adjusting the initial network topological structure according to the ranging result from each base station to its superior base station to obtain a target network topological structure.

In this embodiment, each base station in the target network topological structure is only connected to one superior base station, i.e., each base station in the target network topological structure has one single superior base station, and the base stations with a same hierarchy are not connected to each other. The superior base station may be a base station that is capable of receiving a ranging signal during a ranging process of a base station in a topological structure.

It should be noted that the shallowest topological depth in this embodiment means that the topological depth is the smallest. Assuming that the topological depth of AP1 is 3, the topological depth of AP2 is 4, the topological depth of AP3 is 4, ..., and the topological depth of AP11 is 6, the value of the topological depth of AP1 is the smallest, so the base station AP1 is taken as the master base station.

Figure 4:
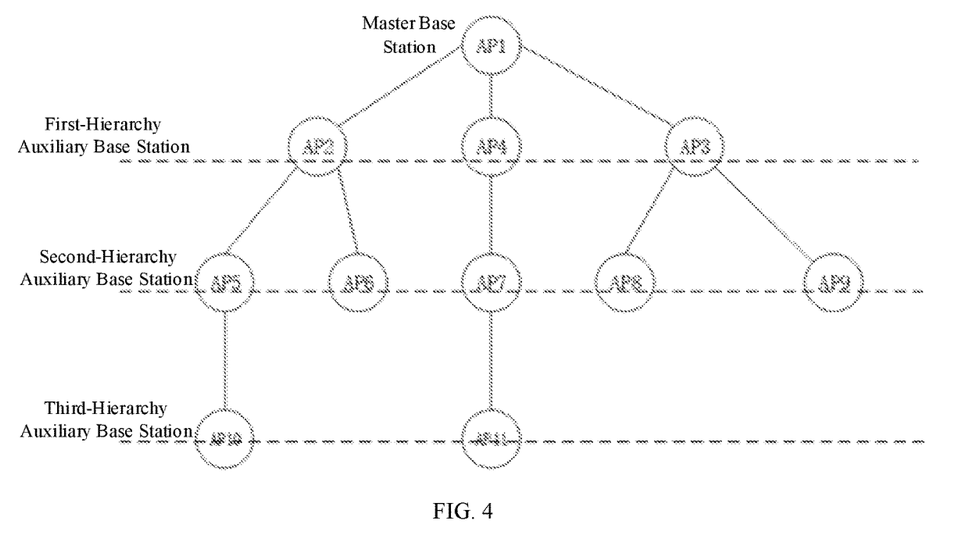
FIG. 4 illustrates a schematic diagram of a target network topological structure according to an embodiment of the present disclosure.

In order to prevent the communication interference between the base stations, it is necessary to adjust the initial network topological structure. Assuming the base station with the shallowest topological depth as the master base station and the shortest distance from each base station to its superior base station as the adjustment principle, when one base station has a plurality of superior base stations, the closest superior base station is selected as the target superior base station, and the base stations with the same hierarchy are not connected to each other, thereby obtaining the target network topological structure as illustrated in FIG. 4.

step S104: allocating a transceiving time slot to each base station according to the target network topological structure to obtain a transceiving time slot periodic table, and making all the base stations transmit and receive synchronous signals according to the transceiving time slot periodic table to obtain a synchronous network of the shelf label system.

In this embodiment, allocating the transceiving time slot to each base station according to the target network topological structure to obtain the transceiving time slot periodic table includes: taking a lower-hierarchy base station directly connected to the master base station as a first-hierarchy auxiliary base station, taking a lower-hierarchy base station connected to the first-hierarchy auxiliary base station as a second-hierarchy auxiliary base station, and so on, to obtain an $N^{th}$-hierarchy auxiliary base station; and taking the master base station as a time slot starting point and allocating transceiving time slots to the N hierarchy auxiliary base stations from the first-hierarchy auxiliary base station to the $N^{th}$-hierarchy auxiliary base station in turn to obtain the transceiving time slot periodic table, where N may be a positive integer greater than 1.

Figure 5:
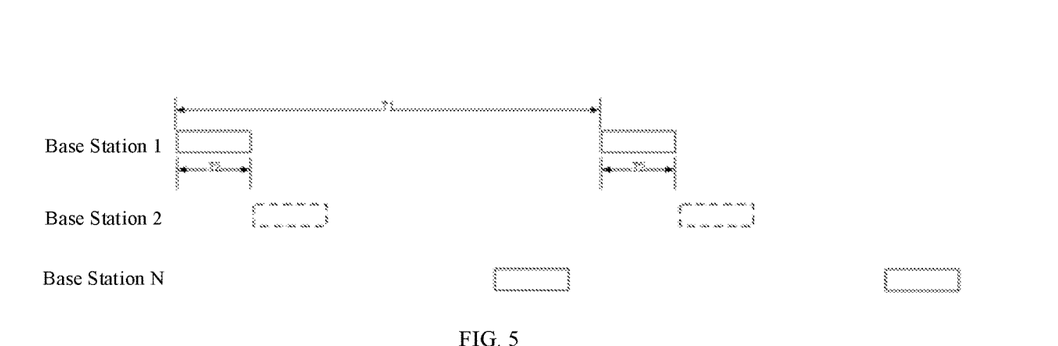
FIG. 5 illustrates a sequence diagram of a transceiving slot periodic table according to an embodiment of the present disclosure.

It should be noted that when the time slots are allocated to the base stations according to the target network topological structure, the master base station is taken as the time slot starting point, then the time slots are allocated to each base station among the first-hierarchy auxiliary base stations in turn, thereafter the time slots are allocated to the second-hierarchy auxiliary base stations, and so on, until the time slots are allocated to the last-hierarchy auxiliary base stations, thus obtaining the transceiving time slot periodic table as illustrated in FIG. 5. Therefore, all the base stations in the target network topological structure can transmit and receive the synchronous signals according to the transceiving time slot periodic table, to synchronize the base stations in the electronic shelf label system to obtain the synchronous network of the electronic shelf label system. In FIG. 5, T1 indicates a transmission period of the synchronization signal, and T2 indicates a transmission duration of the synchronization signal.

Compared with the prior art, this embodiment has the following advantageous effects:

According to this embodiment, an initial network topological structure of base stations is established through ranging results among all the base stations. Next, the initial network topological structure is adjusted according to topological depths and ranging results to obtain a target network topological structure. Finally, a transceiving time slot is allocated to each base station according to the target network topological structure, so that all the base stations transmit and receive synchronization signals according to the allocated transceiving time slots, thereby obtaining a synchronous network of the shelf label system. This embodiment solves the problem that since the existing asynchronous cellular network cannot uniformly schedule the time slots for a plurality of base stations, it is easy to cause a communication failure between the base station and the shelf label due to a time slot conflict and an interference between signals. This embodiment makes full use of time resources to maximize the data throughput of the system communication. This embodiment keeps time synchronization between the plurality of base stations by establishing a synchronous network, and prevents a signal interference by a time-slotted data transmission and reception based on the synchronous network, thereby improving the stability and the data throughput of the electronic shelf label system.

In another embodiment of the present disclosure, after all the base stations transmit and receive the synchronization signals according to the transceiving time slot periodic table, the method further includes: starting, by a current base station, a ranging mode to obtain a second target base station closest to the current base station, if the current base station does not receive a synchronization signal transmitted by a first target base station within a preset time duration, or if the current base station receives a synchronization signal with an intensity less than a preset threshold, wherein the first target base station is a superior base station of the current base station in the target network topological structure; adjusting the target network topological structure by taking the second target base station as the superior base station of the current base station to obtain a first updated network topological structure, when the first target base station and the second target base station belong to a same hierarchy in the target network topological structure; and transmitting and receiving, by all the base stations, the synchronization signal in the first updated network topological structure according to the transceiving time slot periodic table.

It should be noted that, taking AP6 in FIG. 4 as an example, when AP6 moves, and/or AP2 moves, and/or AP2 fails, AP6 cannot receive the synchronization signal transmitted by AP2 or receives the synchronization signal with a weak intensity. In order not to affect the normal communication of AP6, AP6 starts the ranging mode to find the closest AP4, and modifies the superior base station of AP6 into AP4. Since both AP2 and AP4 belong to the first-hierarchy auxiliary base stations in the target network topological structure, the topological depth of the target network topological structure and the hierarchy of the base station are not changed although the superior base station of AP6 is modified, so it is still possible to transmit and receive the synchronization signals according to the previous transceiving time slot periodic table.

Alternatively, when the first target base station and the second target base station do not belong to a same hierarchy in the target network topological structure, the method further includes: adjusting the target network topological structure by taking the second target base station as the superior base station of the current base station, to obtain a second updated network topological structure; re-allocating a transceiving time slot to each base station according to the second updated network topological structure, to obtain an updated transceiving time slot periodic table; and transmitting and receiving, by all the base stations, the synchronization signal in the second updated network topological structure according to the updated transceiving time slot periodic table.

It should be noted that, taking AP7 in FIG. 4 as an example, when AP7 moves, and/or AP4 moves, and/or AP4 fails, AP7 cannot receive the synchronization signal transmitted by AP4 or receives the synchronization signal with a weak intensity. In order not to affect the normal communication of AP7, AP7 starts the ranging mode to find the closest AP6, and modifies the superior base station of AP7 into AP6. Since both AP4 and AP6 do not belong to a same hierarchy in the target network topological structure, the superior base station of AP7, the topological depth of the target network topological structure and the hierarchy of the base station are modified. Therefore, the transceiving time slot periodic table needs to be redistributed based on the modified network topological structure to obtain the updated transceiving time slot periodic table, so that all the base stations in the modified network topological structure can transmit and receive the synchronous signal according to the updated transceiving time slot periodic table.

Therefore, in the synchronous network in this embodiment, the base station can select an optimal superior base station for communication after the base station moves by monitoring synchronization signals or ranging signals of a plurality of base stations, thereby solving the problem that the base station cannot communicate normally after moving.

Referring to FIG. 2, an electronic shelf label 1-N is a communication shelf label of a base station 1, and also falls within a communication range of a base station 2. In fact, the electronic shelf label 1-N can also communicate with the base station 2. However, in the existing asynchronous cellular network, the electronic shelf label 1-N can only receive a data signal of the base station 1, and cannot monitor the signal of any other base station, so it is impossible to realize a movement across the base stations and select the optimal base station for communication. In order to solve the above problem, the electronic shelf label may also monitor the synchronization signal transmitted by the base station to determine whether it is necessary to change the connected base station, and the change process is the same as that for the base station to change the superior base station, which will not be repeated here.

In another embodiment of the present disclosure, after establishing the initial network topological structure of base stations in the store according to ranging results among all the base stations, the method further includes: when there are at least two independent sub-networks in the initial network topological structure, obtaining a target sub-network topological structure corresponding to each sub-network; and obtaining a transceiving time slot period sub-table corresponding to each sub-network according to the target sub-network topological structure, so that the base station in each sub-network transmits and receives a synchronous signal according to the corresponding transceiving time slot period sub-table to obtain a synchronous network of the shelf label system.

Figure 6:
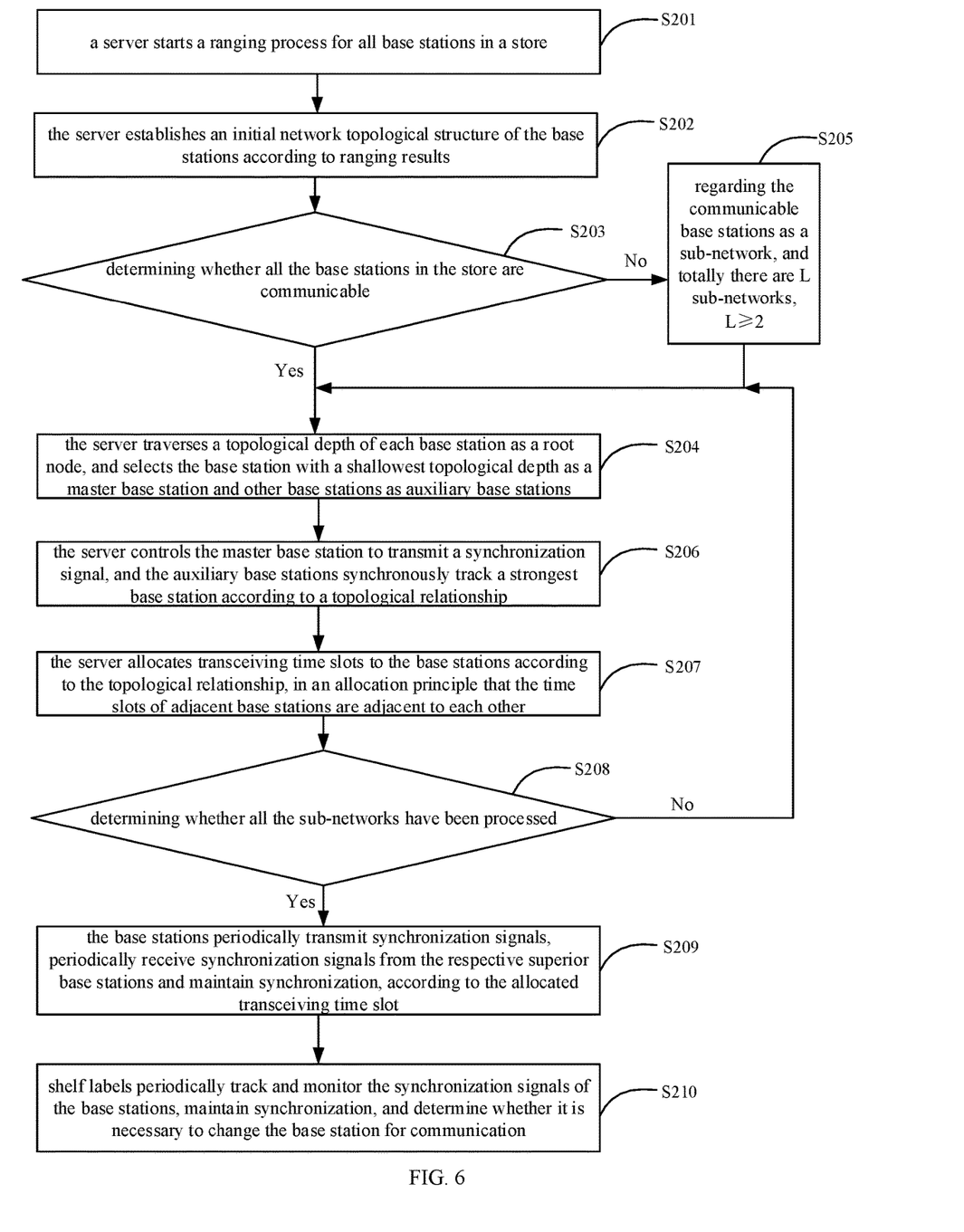
FIG. 6 illustrates a flow diagram of a method for constructing a synchronous network according to another embodiment of the present disclosure.

It should be noted that in order to further adapt to more complex store scenarios, such as scenarios of multiple floors and multiple separation areas, the synchronous network may be constructed by dividing the network into a plurality of sub-networks, and the specific flow is illustrated in FIG. 6:

step S201: a server starts a ranging process for all base stations in a store;

step S202: the server establishes an initial network topological structure of the base stations according to ranging results;

step S203: determining whether all the base stations in the store are communicable, and performing step S204 if it is determined that all the base stations in the store are communicable, or performing step S205 if it is determined that the base stations in the store are not all communicable;

step S204: the server traverses a topological depth of each base station as a root node, and selects the base station with a shallowest topological depth as a master base station and other base stations as auxiliary base stations;

step S205: regarding the communicable base stations as a sub-network, and totally there are L sub-networks;

step S206: the server controls the master base station to transmit a synchronization signal, and the auxiliary base stations synchronously track a strongest base station according to a topological relationship;

step S207: the server allocates transceiving time slots to the base stations according to the topological relationship, in an allocation principle that the time slots of adjacent base stations are adjacent to each other;

step S208: determining whether all the sub-networks have been processed, and performing step S209 if it is determined that all the sub-networks have been processed, or performing step S204 if it is determined that not all the sub-networks have been processed;

step S209: the base stations periodically transmit synchronization signals, periodically receive synchronization signals from the respective superior base stations and maintains synchronization, according to the allocated transceiving time slot;

step S210: shelf labels periodically track and monitor the synchronization signals of the base stations, maintain synchronization, and determine whether it is necessary to change the base station for communication.

That is, when there are at least two independent sub-networks in the initial network topological structure, the network topological structure is adjusted and the transceiving time slot periodic table is established for each sub-network according to step S101 to step S104, so that the base stations in each sub-network transmit and receive synchronization signals according to the corresponding transceiving time slot periodic table, thereby taking the network topological structure composed of all the sub-networks as the synchronous network of the shelf label system.

In addition, the time slot allocation after the multi-base station synchronization can also be adopted for business data transmission and reception and avoid the interference on the data transmission and reception, thereby improving the data throughput of the system communication.

The method for constructing a synchronous network of the electronic shelf label system according to this embodiment solves the problem that since the existing asynchronous cellular network cannot uniformly schedule the time slots for a plurality of base stations, it is easy to cause a communication failure between the base station and the shelf label due to a time slot conflict and an interference between signals. The method makes full use of time resources to maximize data throughput of the system communication. In addition, the synchronous network can provide the synchronization signal, and the shelf label can monitor the synchronization signal of a plurality of base stations to find a cross-base station movement and select an optimal base station for communication, thereby solving the problem that the shelf label cannot communicate normally after moving.

In another aspect, the present disclosure provides a shelf label system, which specifically includes a server, base stations and an electronic shelf label. The server is configured to establish an initial network topological structure of base stations in a store according to ranging results among all the base stations. The server is further configured to perform topology depth traversal by taking each base station as a root node according to the initial network topological structure, to obtain a topology depth corresponding to each base station. The server is further configured to take the base station with a shallowest topological depth as a master base station, and adjust the initial network topological structure according to the ranging result from each base station to its superior base station to obtain a target network topological structure, where each base station in the target network topological structure is only connected to one superior base station. The server is further configured to allocate a transceiving time slot to each base station according to the target network topological structure to obtain a transceiving time slot periodic table. The base stations are configured to transmit and receive synchronous signals according to the transceiving time slot periodic table to obtain a synchronous network of the shelf label system.

In another aspect, an embodiment of the invention provides a computer device, which includes a memory, a processor and a computer program stored in the memory and executable on the processor. The processor is configured to execute the computer program to implement the steps of: establishing an initial network topological structure of base stations in a store according to ranging results among all the base stations; performing topology depth traversal by taking each base station as a root node according to the initial network topological structure, to obtain a topology depth corresponding to each base station; taking the base station with a shallowest topological depth as a master base station, and adjusting the initial network topological structure according to the ranging result from each base station to its superior base station to obtain a target network topological structure, where each base station in the target network topological structure is only connected to one superior base station; and allocating a transceiving time slot to each base station according to the target network topological structure to obtain a transceiving time slot periodic table, and making all the base stations transmit and receive synchronous signals according to the transceiving time slot periodic table to obtain a synchronous network of the shelf label system.

In another aspect, an embodiment of the present disclosure provides a readable storage medium storing a computer program. When being executed by a processor, the computer program implements the steps of: establishing an initial network topological structure of base stations in a store according to ranging results among all the base stations; performing topology depth traversal by taking each base station as a root node according to the initial network topological structure, to obtain a topology depth corresponding to each base station; taking the base station with a shallowest topological depth as a master base station, and adjusting the initial network topological structure according to the ranging result from each base station to its superior base station to obtain a target network topological structure, where each base station in the target network topological structure is only connected to one superior base station; and allocating a transceiving time slot to each base station according to the target network topological structure to obtain a transceiving time slot periodic table, and making all the base stations transmit and receive synchronous signals according to the transceiving time slot periodic table to obtain a synchronous network of the shelf label system.

According to the present disclosure, an initial network topological structure of all base stations is established through ranging results among all the base stations; next, the initial network topological structure is adjusted according to topological depths and the ranging results to obtain a target network topological structure; finally, a transceiving time slot is allocated to each base station according to the target network topological structure, so that all the base stations transmit and receive synchronization signals according to the allocated transceiving time slots, thereby obtaining a synchronous network of the shelf label system. The present disclosure solves the problem that since the existing asynchronous cellular network cannot uniformly schedule time slots for a plurality of base stations, it is easy to cause a communication failure between the base station and the shelf label due to a time slot conflict and an interference between signals. The present disclosure makes full use of time resources to maximize the data throughput of the system communication. By establishing a synchronous network, the present disclosure keeps time synchronization between the plurality of base stations by establishing a synchronous network, and prevents a signal interference by a time-slotted data transmission and reception based on the synchronous network, thereby improving the stability and the data throughput of the electronic shelf label system.

Those of ordinary skills in the art can understand that all or part of the flows in the aforementioned method embodiments can be completed by instructing relevant hardware through a computer program that may be stored in a non-volatile computer-readable storage medium, and when executed, the program can include the flows of the aforementioned method embodiments. In which, any reference to a memory, a storage, a database or any other medium adopted in the embodiments of the present disclosure can include a non-volatile memory and/or a volatile memory. The nonvolatile memory may include a read-only memory (ROM), a programmable ROM (PROM), an electrically programmable ROM (EPROM), an electrically erasable programmable ROM (EEPROM) or a flash memory. The volatile memory may include a random-access memory (RAM) or an external cache memory. By way of illustration rather than limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synch-link DRAM (SLDRAM), a memory bus (Rambus) direct RAM (RDRAM), a direct memory bus dynamic RAM (DRDRAM) and a memory bus dynamic RAM (RDRAM).

It should be noted that herein, the relational terms such as 'first' and 'second' are only used to distinguish one entity or operation from another entity or operation, and do not necessarily require or imply any such actual relationship or sequence between these entities or operations. In addition, the term "comprise," "include" or any other variation thereof is intended to cover non-exclusive inclusions, so that a process, method, article or device that includes a series of elements includes not only those elements, but also other elements not explicitly listed, or further includes elements inherent to such process, method, article or device. Without further restrictions, an element defined by a statement "comprising a . . . " does not exclude the existence of other identical elements in a process, method, article or device that includes said element.

What is claimed is:

1. A shelf label system, comprising:
one or more base stations;
at least one server that communicates with the one or more base station and is configured to:
obtain a target network topological structure according to a master base station having a shallowest topological depth and a ranging result between a base station and a superior base station of the base station, wherein each base station in the target network topological structure has a single superior base station;
generate a transceiving time slot periodic table by allocating a transceiving time slot to each base station according to the target network topological structure; and obtain a synchronous network of the shelf label system by instructing the one or more base stations to transmit and receive synchronous signals according to the transceiving time slot periodic table; and one or more electronic shelf labels that receive the synchronous signals from the one or more base stations.

2. The shelf label system according to claim 1, wherein the at least one server is further configured to:

obtain a $N^{th}$-hierarchy auxiliary base station by taking a lower-hierarchy base station directly connected to the master base station as a first-hierarchy auxiliary base station and taking a lower-hierarchy base station connected to the $(N-1)^{th}$-hierarchy auxiliary base station as a $N^{th}$-hierarchy auxiliary base station, wherein N is a positive integer that is greater than 1; and obtain the transceiving time slot periodic table by taking the master base station as a time slot starting point and allocating transceiving time slots to the first-hierarchy auxiliary base station to the $N^{th}$-hierarchy auxiliary base station in turn.

3. The shelf label system according to claim 1, wherein the ranging result is obtained based on an initial network topological structure of the one or more base stations.

4. The shelf label system according to claim 3, wherein the shallowest topological depth has a smallest topological depth of all topological depths obtained by performing topology depth traversal on the initial network topological structure of the one or more base stations.

5. The shelf label system according to claim 4, wherein in response to determining that there are at least two independent sub-networks in the initial network topological structure, the at least one server is further configured to:

obtain a target sub-network topological structure corresponding to each sub-network; and obtain a transceiving time slot period sub-table corresponding to each sub-network according to the target sub-network topological structure such that a base station in each sub-network transmits and receives a synchronous signal according to a corresponding transceiving time slot period sub-table to obtain a synchronous network of the shelf label system.

6. The shelf label system according to claim 1, wherein the at least one server is further configured to:

in response to determining that a current base station does not receive a synchronization signal transmitted by a first target base station within a preset time duration, or in response to determining that the current base station receives a synchronization signal with an intensity less than a preset threshold, instruct the current base station to initiate a ranging mode to obtain a second target base station closest to the current base station, wherein the first target base station is a superior base station of the current base station in the target network topological structure; and in response to determining that the first target base station and the second target base station belong to a same hierarchy in the target network topological structure, obtain a first updated network topological structure by adjusting the target network topological structure by taking the second target base station as the superior base station of the current base station, wherein the one or more base stations transmit and receive the synchronization signals in the first updated network topological structure according to the transceiving time slot periodic table.

7. The shelf label system according to claim 6, wherein in response to determining that the first target base station and the second target base station do not belong to a same hierarchy in the target network topological structure, the at least one server is further configured to:

obtain a second updated network topological structure by adjusting the target network topological structure using the second target base station as the superior base station of the current base station; and obtain an updated transceiving time slot periodic table by re-allocating a transceiving time slot to each base station according to the second updated network topological structure, wherein the one or more base stations transmit and receive the synchronization signals in the second updated network topological structure according to the updated transceiving time slot periodic table.

8. The shelf label system according to claim 4, wherein performing the topology depth traversal on the initial network topological structure of the one or more base stations comprises:

taking a current base station as a root node, and taking a base station directly connected to the current base station as a first-hierarchy depth base station;

in response to determining that there is a lower-hierarchy base station connected to the $M-1^{th}$-hierarchy depth base station, taking the lower-hierarchy base station as a $M^{th}$-hierarchy depth base station, wherein M is a positive integer greater than 1; and in response to determining that there is no base station connected to the $M^{th}$-hierarchy depth base station, setting a topological depth of the current base station as M.

9. The shelf label system according to claim 8, wherein performing the topology depth traversal on the initial network topological structure of the one or more base stations further comprises:

in response to determining that there is a target depth base station belonging to an $X^{th}$-hierarchy depth base station or an $(X-1)^{th}$-hierarchy depth base station among lower-hierarchy base stations connected to the $X^{th}$-hierarchy depth base station, determining that the target depth base station is not counted in an $(X+1)^{th}$-hierarchy depth base station, wherein X is a positive integer greater than 1.

10. A method for constructing a synchronous network, comprising:

obtaining, by at least one server in a shelf label system, a target network topological structure according to a master base station having a shallowest topological depth and a ranging result between a base station and a superior base station of the base station, wherein each base station in the target network topological structure has a single superior base station;

generate, by the at least one server, a transceiving time slot periodic table by allocating a transceiving time slot to each base station according to the target network topological structure; and obtain, by the at least one server, a synchronous network of the shelf label system by instructing one or more base stations in the shelf label system to transmit and receive synchronous signals according to the transceiving time slot periodic table, wherein one or more electronic shelf labels in the shelf label system receive the synchronous signals from the one or more base stations.

11. The method of claim 10, further comprising:

obtaining, by the at least one server, a $N^{th}$-hierarchy auxiliary base station by taking a lower-hierarchy base station directly connected to the master base station as a first-hierarchy auxiliary base station and taking a lower-hierarchy base station connected to the $(N-1)^{th}$-hierarchy auxiliary base station as a $N^{th}$-hierarchy auxiliary base station, wherein N is a positive integer that is greater than 1; and obtaining, by the at least one server, the transceiving time slot periodic table by taking the master base station as a time slot starting point and allocating transceiving time slots to the first-hierarchy auxiliary base station to the $N^{th}$-hierarchy auxiliary base station in turn.

12. The method of claim 10, further comprising:

obtaining, by the at least one server, the ranging result based on an initial network topological structure of the one or more base stations; and obtaining, by the at least one server, the shallowest topological depth having a smallest topological depth of all topological depths by performing topology depth traversal on an initial network topological structure of the one or more base stations.

13. The method of claim 12, further comprising:

in response to determining that there are at least two independent sub-networks in the initial network topological structure, obtaining, by the at least one server, a target sub-network topological structure corresponding to each sub-network; and obtaining, by the at least one server, a transceiving time slot period sub-table corresponding to each sub-network according to the target sub-network topological structure such that a base station in each sub-network transmits and receives a synchronous signal according to a corresponding transceiving time slot period sub-table to obtain a synchronous network of the shelf label system.

14. The method of claim 10, further comprising:

in response to determining that a current base station does not receive a synchronization signal transmitted by a first target base station within a preset time duration, or in response to determining that the current base station receives a synchronization signal with an intensity less than a preset threshold, instructing, by the at least one server, the current base station to initiate a ranging mode to obtain a second target base station closest to the current base station, wherein the first target base station is a superior base station of the current base station in the target network topological structure; and in response to determining that the first target base station and the second target base station belong to a same hierarchy in the target network topological structure, obtain, by the at least one server, a first updated network topological structure by adjusting the target network topological structure by taking the second target base station as the superior base station of the current base station, wherein the one or more base stations transmit and receive the synchronization signals in the first updated network topological structure according to the transceiving time slot periodic table.

15. The method of claim 14, further comprising:

in response to determining that the first target base station and the second target base station do not belong to a same hierarchy in the target network topological structure, obtaining, by the at least one server, a second updated network topological structure by adjusting the target network topological structure using the second target base station as the superior base station of the current base station; and obtaining, by the at least one server, an updated transceiving time slot periodic table by re-allocating a transceiving time slot to each base station according to the second updated network topological structure, wherein the one or more base stations transmit and receive the synchronization signals in the second updated network topological structure according to the updated transceiving time slot periodic table.

16. The method according to claim 12, wherein performing the topology depth traversal on the initial network topological structure of the one or more base stations comprises:

taking a current base station as a root node, and taking a base station directly connected to the current base station as a first-hierarchy depth base station;

in response to determining that there is a lower-hierarchy base station connected to the $M-1^{th}$-hierarchy depth base station, taking the lower-hierarchy base station as a $M^{th}$-hierarchy depth base station, wherein M is a positive integer greater than 1; and in response to determining that there is no base station connected to the $M^{th}$-hierarchy depth base station, setting a topological depth of the current base station as M.

17. The method according to claim 16, wherein performing the topology depth traversal on the initial network topological structure of the one or more base stations further comprises:

in response to determining that there is a target depth base station belonging to an $X^{th}$-hierarchy depth base station or an $(X-1)^{th}$-hierarchy depth base station among lower-hierarchy base stations connected to the $X^{th}$-hierarchy depth base station, determining that the target depth base station is not counted in an $(X+1)^{th}$-hierarchy depth base station, wherein X is a positive integer greater than 1.

18. A non-transitory computer readable storage medium storing a plurality of programs for execution by at least one server in a shelf label system, wherein the server has one or more processors, and the plurality of programs, when executed by the one or more processors, cause the at least one server to perform acts comprising:

obtaining a target network topological structure according to a master base station having a shallowest topological depth and a ranging result between a base station and a superior base station of the base station, wherein each base station in the target network topological structure has a single superior base station;

generating a transceiving time slot periodic table by allocating a transceiving time slot to each base station according to the target network topological structure; and obtaining a synchronous network of the shelf label system by instructing one or more base stations in the shelf label system to transmit and receive synchronous signals according to the transceiving time slot periodic table, wherein one or more electronic shelf labels in the shelf label system receive the synchronous signals from the one or more base stations.

19. The non-transitory computer readable storage medium according to claim 18, wherein the at least one server is caused to perform acts further comprising:

obtaining a $N^{th}$-hierarchy auxiliary base station by taking a lower-hierarchy base station directly connected to the master base station as a first-hierarchy auxiliary base station and taking a lower-hierarchy base station connected to the $(N-1)^{th}$-hierarchy auxiliary base station as a $N^{th}$-hierarchy auxiliary base station, wherein N is a positive integer that is greater than 1; and obtaining the transceiving time slot periodic table by taking the master base station as a time slot starting point and allocating transceiving time slots to the first-hierarchy auxiliary base station to the $N^{th}$-hierarchy auxiliary base station in turn.

20. The non-transitory computer readable storage medium according to claim 18, wherein the at least one server is caused to perform acts further comprising:

obtaining the ranging result based on an initial network topological structure of the one or more base stations;

obtaining the shallowest topological depth having a smallest topological depth of all topological depths by performing topology depth traversal on an initial network topological structure of the one or more base stations; and in response to determining that there are at least two independent sub-networks in the initial network topological structure, obtaining a target sub-network topological structure corresponding to each sub-network; and obtaining a transceiving time slot period sub-table corresponding to each sub-network according to the target sub-network topological structure such that a base station in each sub-network transmits and receives a synchronous signal according to a corresponding transceiving time slot period sub-table to obtain a synchronous network of the shelf label system.

* * * * *